(12) United States Patent
Maruyama et al.

(10) Patent No.: US 10,436,987 B2
(45) Date of Patent: Oct. 8, 2019

(54) OPTICAL MODULE

(71) Applicant: Fujitsu Optical Components Limited, Kawasaki-shi, Kanagawa (JP)

(72) Inventors: Shinji Maruyama, Sapporo (JP); Yoshinobu Kubota, Yokohama (JP); Yoshimitsu Sakai, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/689,617

(22) Filed: Aug. 29, 2017

(65) Prior Publication Data

US 2018/0095225 A1    Apr. 5, 2018

(30) Foreign Application Priority Data

Sep. 30, 2016   (JP) .................. 2016-193712

(51) Int. Cl.
*G02B 6/42*     (2006.01)
*G02B 6/30*     (2006.01)
*G02F 1/03*     (2006.01)
*G02F 1/035*    (2006.01)

(52) U.S. Cl.
CPC .............. *G02B 6/30* (2013.01); *G02F 1/035* (2013.01); *G02F 1/0311* (2013.01)

(58) Field of Classification Search
USPC .................................................. 385/33–35
See application file for complete search history.

(56) References Cited

U.S. PATENT DOCUMENTS

| 10,054,744 | B2 * | 8/2018 | Doi ........................ G02B 6/30 |
| 2006/0239605 | A1 * | 10/2006 | Palen ................... G02B 6/4206 |
| | | | 385/14 |
| 2010/0202784 | A1 | 8/2010 | Sugiyama |

(Continued)

FOREIGN PATENT DOCUMENTS

| JP | 5-188238 | 7/1993 |
| JP | 2004-271681 | 9/2004 |
| JP | 2010-185978 | 8/2010 |

(Continued)

OTHER PUBLICATIONS

Office Action, dated Oct. 3, 2017, in Japanese Application No. 2016193712 (4 pp.).

(Continued)

*Primary Examiner* — Eric Wong
(74) *Attorney, Agent, or Firm* — Staas & Halsey LLP

(57) ABSTRACT

An optical module includes a substrate on which an optical waveguide is provided; a housing that houses the substrate and includes a through path arranged on a side wall of the housing so as to extend in a direction that crosses the optical waveguide; a ferrule that houses an end portion of an optical fiber; and an optical path conversion element that is fixed on the ferrule, that is fixed on an end surface of the substrate on the end portion side of the optical waveguide, and that has a size smaller than a width of the substrate and a width of the ferrule along a longitudinal direction of the substrate. The end portion of the optical waveguide is arranged at a position close to the through path of the housing relative to a central portion in a width direction of the substrate.

2 Claims, 3 Drawing Sheets

(56) References Cited

U.S. PATENT DOCUMENTS

2014/0153881 A1\* 6/2014 Liff .................... G02B 6/4214
385/89
2017/0123287 A1 5/2017 Hara et al.

FOREIGN PATENT DOCUMENTS

JP 2015-194517 11/2015
JP 2016-90614 5/2016

OTHER PUBLICATIONS

Japanese Office Action dated Apr. 27, 2017 in corresponding Japanese Patent Application No. 2016-193712.

\* cited by examiner

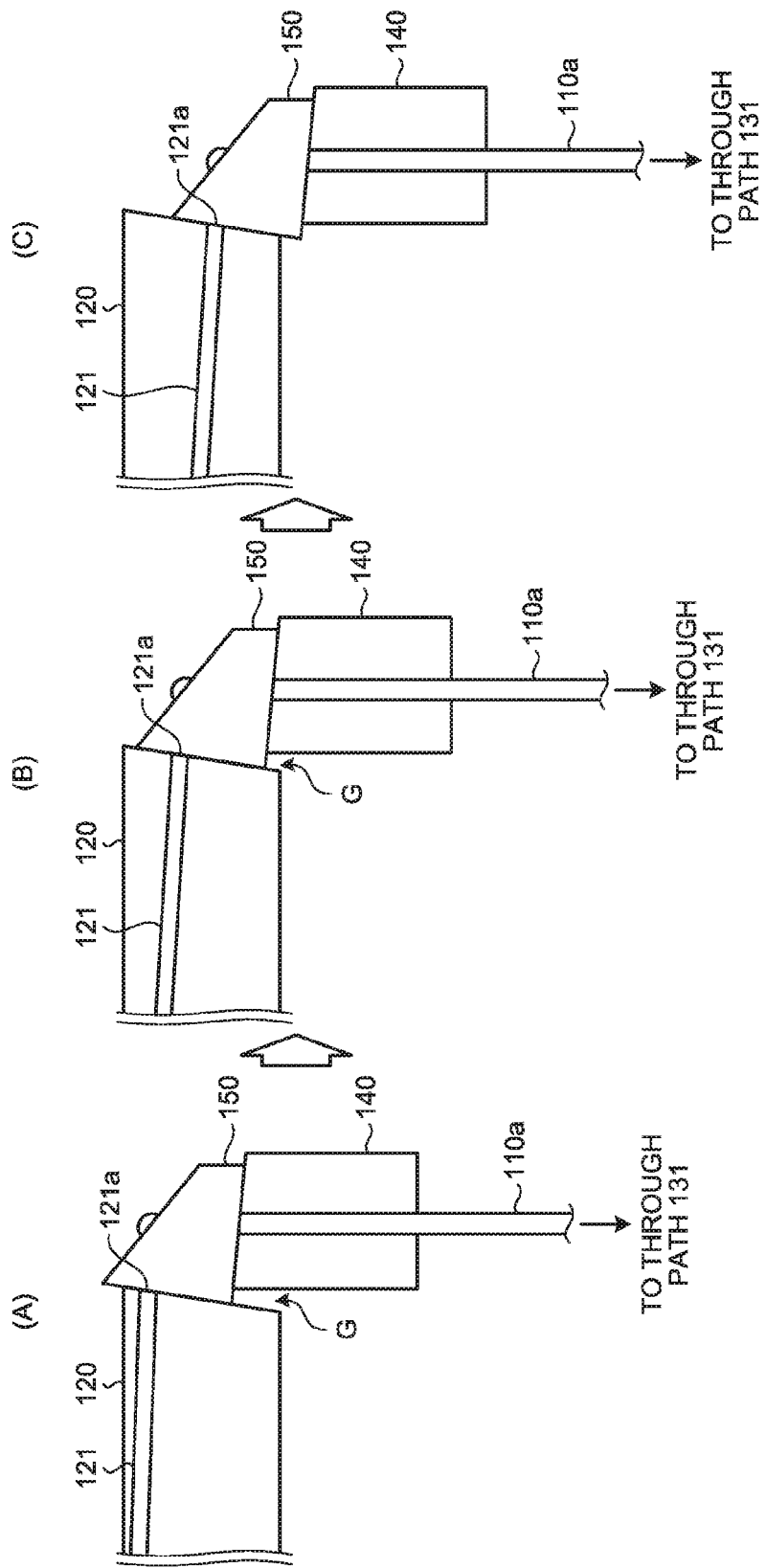

OPTICAL MODULE

CROSS-REFERENCE TO RELATED APPLICATION

This application is based upon and claims the benefit of priority of the prior Japanese Patent Application. No. 2016-193712, filed on Sep. 30, 2016, the entire contents of which are incorporated herein by reference.

FIELD

The embodiment discussed herein is related to an optical module.

BACKGROUND

As an optical modulator of an optical transmission system, a Mach-Zehnder type optical modulator using lithium niobate (LiNbO3) or the like (hereinafter, referred to as an "LN optical modulator") has been known. The LN optical modulator has a good high-speed characteristic and a good chirp characteristic, and therefore is widely used especially for an optical transmission system with a high speed of 10 GHz or higher. A light transmitting/receiving device equipped with the LN optical modulator includes components other than the LN optical modulator; therefore, from the viewpoint of realizing high-density mounting, it is desirable to reduce the size of the LN optical modulator.

In the LN optical modulator, for example, an optical waveguide provided on a substrate and an input/output optical fiber connected to the optical waveguide are arranged so as to extend in the same direction. Therefore, a space for arranging the optical fiber along the extending direction of the optical waveguide is needed, which leads to an increase in the size of the LN optical modulator along the extending direction of the optical waveguide.

Therefore, to prevent an increase in the size of the LN optical modulator, studies have been conducted such that the optical waveguide and the optical fiber are arranged so as to cross each other and an optical path conversion element provided between the optical waveguide and the optical fiber converts an optical path of light such that the optical path goes toward an end portion of the optical waveguide.

Patent Literature 1: Japanese Laid-open Patent Publication No. 5-188238

If the optical path conversion element is provided between the optical waveguide and the optical fiber, for example, the optical path conversion element is fixed on a ferrule that houses an end portion of the optical fiber. Furthermore, the optical path conversion element fixed on the ferrule is inserted from a through path of a housing that houses the substrate on which the optical waveguide is provided, and is fixed on an end surface of the substrate on the optical waveguide side by using an adhesive agent. Moreover, the through path of the housing is sealed by using a solder in order to ensure the airtightness inside the housing.

In this case, if the size of the optical path conversion element is greater than the width of the substrate and the width of the ferrule along the longitudinal direction of the substrate, it becomes difficult to insert the optical path conversion element from the through path of the housing when the optical modulator is constructed. Therefore, a countermeasure such as an increase in the width of the through path of the housing is taken. However, if the width of the through path of the housing is increased, it becomes difficult to seal the through path of the housing with a solder. In this manner, an increase in the width of the through path of the housing may lead to a reduction in the sealing performance of the through path of the housing, which is not preferable.

To cope with this, in some cases, a countermeasure such as a reduction in the size of the optical path conversion element is taken instead of a countermeasure such as an increase in the width of the through path of the housing. For example, it may be possible to reduce the size of the optical path conversion element relative to the width of the substrate and the width of the ferrule along the longitudinal direction of the substrate. If the size of the optical path conversion element is reduced relative to the width of the substrate and the width of the ferrule along the longitudinal direction of the substrate, in some cases, a gap may be generated between the substrate and the ferrule depending on a bonded state of the optical path conversion element and the substrate. If the optical path conversion element is fixed on the end surface of the substrate on an end portion side of the optical waveguide by using an adhesive agent in the state in which the gap exists between the substrate and the ferrule as described, above, the adhesive agent applied to bonded surfaces of the optical path conversion element and the substrate may spill out around the bonded surfaces and may flow into the above-described gap. Consequently, the substrate and the ferrule may accidentally be bonded with the adhesive agent that has flown into the above-described gap. The adhesive agent that has flown into the above-described gap generally has a heat-shrinkable property, and therefore shrinks when temperature of the optical modulator changes. Therefore, with a change in the volume of the adhesive agent caused by thermal shrinkage, the substrate and the ferrule bonded together with the adhesive agent are attracted to each other, and an optical axis of the optical path conversion element fixed on the ferrule is shifted from the initial position. Consequently, a relative positional relationship of the optical path conversion element and the optical waveguide on the substrate is shifted, and an optical loss of the optical modulator may fluctuate.

SUMMARY

According to an aspect of an embodiment, an optical module includes a substrate on which an optical waveguide is provided; a housing that houses the substrate and includes a through path for sealing, the through path being arranged on a side wall of the housing so as to extend in a direction that crosses the optical waveguide; a ferrule that houses an end portion of an optical fiber; and an optical path conversion element that is fixed on the ferrule, that is inserted from the through path of the housing and fixed on an end surface of the substrate on an end portion side of the optical waveguide, that converts an optical path of light emitted from the end portion of the optical fiber housed in the ferrule such that the optical path goes toward the end portion of the optical waveguide, and that has a size smaller than a width of the substrate and a width of the ferrule along a longitudinal direction of the substrate, wherein the end portion of the optical waveguide is arranged at a position close to the through path of the housing relative to a central portion in a width direction of the substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining modes of arrangement of the optical waveguide and an end portion and a relationship with a gap between a substrate and a ferrule in the embodiment.

DESCRIPTION OF EMBODIMENT

Preferred embodiments of the present invention will be explained with reference to accompanying drawings. The disclosed technology is not limited to the embodiments.

Figure 1:
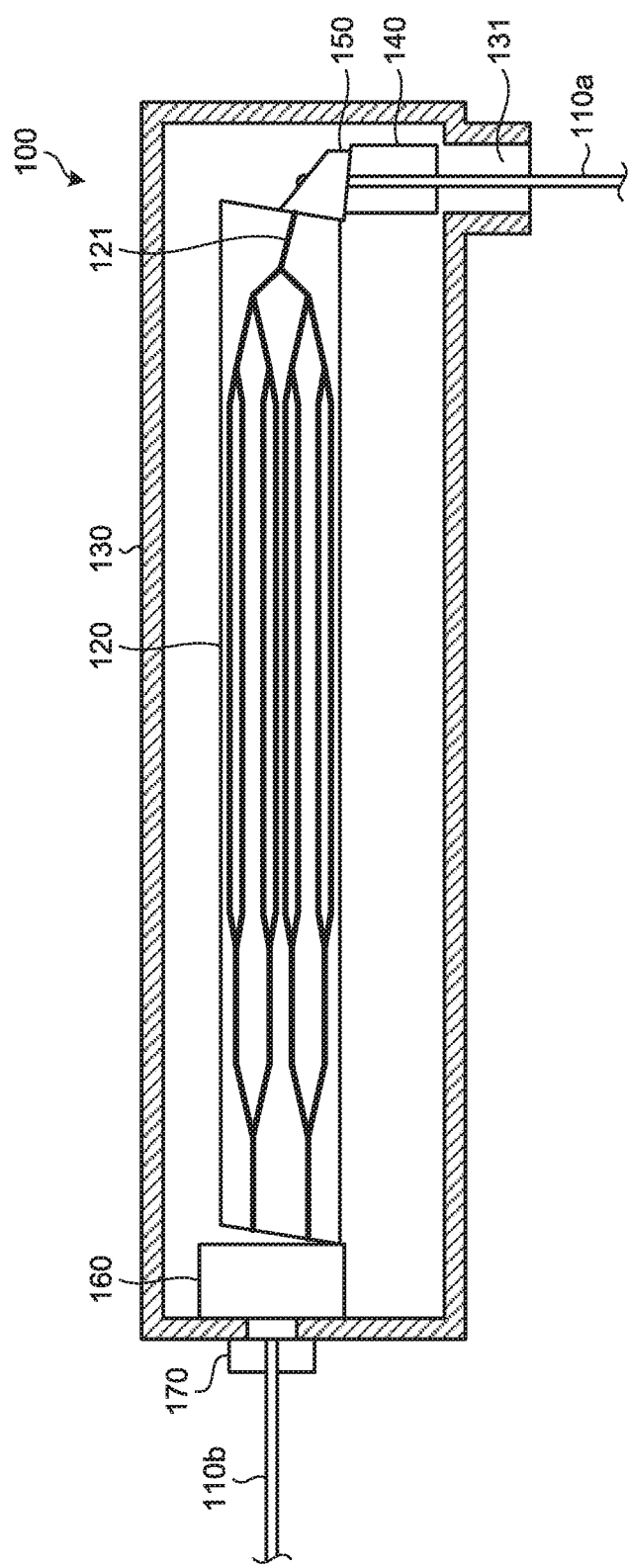
FIG. 1 is a diagram illustrating a configuration of an LN optical modulator according to an embodiment.

FIG. 1 is a diagram illustrating a configuration of an LN optical modulator 100 according to an embodiment. The LN optical modulator 100 illustrated in FIG. 1 is connected to optical fibers 110a and 110b that are arranged so as to cross each other. In the LN optical modulator 100 illustrated in FIG. 1, signal light is input from the optical fiber 110a and signal light is output from the optical fiber 110b. The LN optical modulator 100 includes a substrate 120, a housing 130, a ferrule 140, an optical path conversion element 150, a polarized wave coupler 160, and a ferrule 170.

The substrate 120 is made with lithium niobate (LiNbO3), and is also referred to as an LN substrate. An optical waveguide 121 is provided on the substrate 120. The optical waveguide 121 splits signal light input from the optical path conversion element 150 into two beams of signal light, and modulates each beam of the signal light by an electrical signal to thereby obtain two optical beams. The optical waveguide 121 then outputs the two optical beams to the polarized wave coupler 160.

The housing 130 is a package for housing the substrate 120, the ferrule 140, the optical path conversion element 150, and the polarized wave coupler 160. On a side wall of the housing 130, a through path 131 for sealing is provided so as to extend in a direction that crosses the optical waveguide 121. The through path 131 includes, for example, a through hole that pierces through the side wall of the housing 130 and a tubular portion (pipe) connected to the through hole. The ferrule 140 and the optical path conversion element 150 are inserted into the housing 130 through the through path 131. Then, to ensure the airtightness inside the housing 130, the through path 131 is sealed with a solder in a state in which the ferrule 140 and the optical path conversion element 150 are inserted in the housing 130.

The ferrule 140 houses an end portion of the optical fiber 110a and holds the optical fiber 110a.

The optical path conversion element 150 is fixed on the ferrule 140 and fixed on an end surface of the substrate 120. The optical path conversion element 150 converts an optical path of signal light emitted from the end of the optical fiber 110a housed in the ferrule 140, and inputs the signal light with the converted optical path to the optical waveguide 121. With this configuration, the optical waveguide 121 and the optical fiber 110a are arranged so as to cross each other and the optical fiber 110a and the optical waveguide 121 are optically connected via the optical path conversion element 150. A connected portion of the optical fiber 110a, the optical path conversion element 150, and the optical waveguide 121 will be described later.

The polarized wave coupler 160 synthesizes two optical beams output from the substrate 120 to generate an optical beam including two polarized waves whose polarization directions are perpendicular to each other, and outputs the generated optical beam to an end portion of the optical fiber 110b.

The ferrule 170 houses the end portion of the optical fiber 110b and holds the optical fiber 110b.

Figure 2:
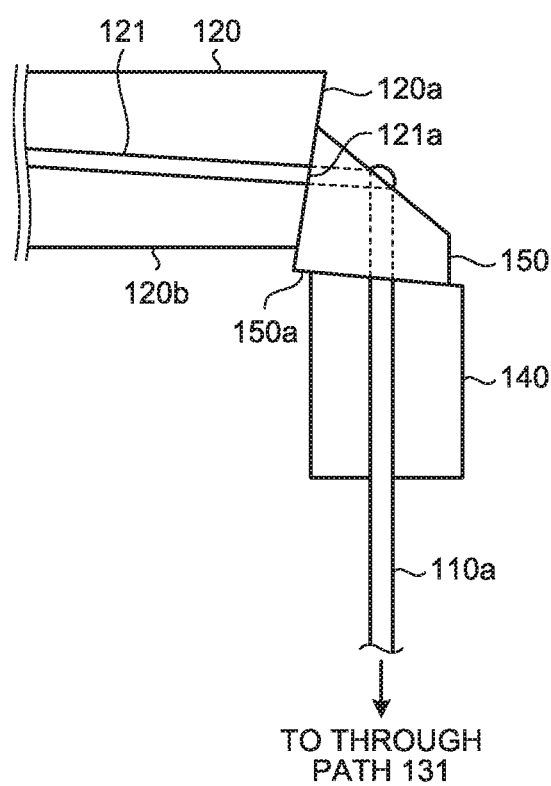
FIG. 2 is an enlarged plan view illustrating a configuration of a connected portion of an optical fiber, an optical path conversion element, and an optical waveguide according to the embodiment.

FIG. 2 is an enlarged plan view illustrating a configuration of the connected portion of the optical fiber 110a, the optical path conversion element 150, and the optical waveguide 121 according to the embodiment. As illustrated in FIG. 2, the optical path conversion element 150 is fixed on the ferrule 140 and fixed on an end surface 120a of the substrate 120 on an end portion 121a side of the optical waveguide 121. Specifically, in a state in which the optical path conversion element 150 is bonded to the ferrule 140, the optical path conversion element 150 is inserted together with the ferrule 140 from the through path 131 of the housing 130, and bonded to the end surface 120a of the substrate 120 on the end portion 121a side of the optical waveguide 121 by using an adhesive agent.

Meanwhile, to ensure the airtightness inside the housing 130, the through path 131 of the housing 130 is sealed with a solder in a state in which the ferrule 140 and the optical path conversion element 150 are inserted in the housing 130. To maintain the sealing performance using the solder, it is preferable to reduce the width (inner diameter) of the through path 131 of the housing 130 as much as possible.

Therefore, in the embodiment, the size of the optical path conversion element 150 is reduced without increasing the width (inner diameter) of the through path 131 of the housing 130. Specifically, as illustrated in FIG. 2, the size of the optical path conversion element 150 is smaller than the width of the substrate 120 and the width of the ferrule 140 along the longitudinal direction of the substrate 120. Consequently, even when the width (inner diameter) of the through path 131 of the housing 130 is maintained, the optical path conversion element 150 can easily be inserted from the through path 131 of the housing 130.

However, when the size of the optical path conversion element 150 is smaller than the width of the substrate 120 and the width of the ferrule 140 along the longitudinal direction of the substrate 120, a gap may be generated between the substrate 120 and the ferrule 140 depending on the bonded state of the optical path conversion element 150 and the substrate 120. In this state, when the optical path conversion element 150 is fixed on the end surface 120a of the substrate 120 on the end portion 121a side of the optical waveguide 121 by using an adhesive agent, the adhesive agent applied to bonded surfaces of the optical path conversion element 150 and the substrate 120 may spill out around the bonded surfaces and may flow into the above-described gap. Consequently, the substrate 120 and the ferrule 140 may accidentally be bonded with the adhesive agent that has flown into the above-described gap. The adhesive agent that has flown into the above-described gap generally has a heat-shrinkable property, and therefore shrinks when temperature of the LN optical modulator 100 changes. Therefore, with a change in the volume of the adhesive agent caused by thermal shrinkage, the substrate 120 and the ferrule 140 bonded together with the adhesive agent are attracted to each other, and an optical axis of the optical path conversion element 150 fixed on the ferrule 140 is shifted from the initial position. Consequently, a relative positional relationship of the optical path conversion element 150 and the optical waveguide 121 on the substrate 120 may be shifted, and an optical loss of the LN optical modulator 100 may fluctuate. To cope with this, in the embodiment, a mode of arrangement of the end portion 121a of the optical waveguide 121 is modified in order to prevent fluctuation in the optical loss caused by a temperature change.

FIG. 3 is a diagram for explaining modes of arrangement of the end portion 121a of the optical waveguide 121 and a relationship with a gap between the substrate 120 and the ferrule 140 in the embodiment. Inventors of the LN optical modulator 100 according to the embodiment have earnestly conducted examinations and found that the size of the gap between the substrate 120 and the ferrule 140 changes depending on the mode of arrangement of the end portion 121a of the optical waveguide 121.

Specifically, as illustrated in FIGS. 3(A) and 3(B), it is assumed that the end portion 121a of the optical waveguide 121 is arranged at a position far from the through path 131 of the housing 130 relative to a central portion in the width direction of the substrate 120. In this case, a gap G is generated between the substrate 120 and the ferrule 140 depending on a mode of bonding of the optical path conversion element 150 and the substrate 120. As described above, in the state in which the gap G exists, the substrate 120 and the ferrule 140 are accidentally bonded with the adhesive agent that has flown into the gap G, and a relative positional relationship of the optical path conversion element 150 and the optical waveguide 121 is shifted due to the occurrence of a change in the volume of the adhesive agent caused by a temperature change. Consequently, when the end portion 121a of the optical waveguide 121 is arranged at a position far from the through path 131 of the housing 130 relative to the central portion in the width direction of the substrate 120, the optical loss fluctuates.

In contrast, as illustrated in FIG. 3(C), it is assumed that the end portion 121a of the optical waveguide 121 is arranged at a position close to the through path 131 of the housing 130 relative to the central portion in the width direction of the substrate 120. In this case, the gap G between the substrate 120 and the ferrule 140 is eliminated (or reduced relative to the gap G illustrated in FIGS. 3(A) and 3(B)). When the gap G is eliminated (or reduced relative to the gap G illustrated in FIGS. 3(A) and 3(B)), an adhesive agent does not flow into the gap G and a relative positional relationship of the optical path conversion element 150 and the optical waveguide 121 is not shifted. Consequently, it is possible to reduce fluctuation in the optical loss caused a temperature change. Therefore, in the embodiment, the end portion 121a of the optical waveguide 121 is arranged at a position close to the through path 131 of the housing 130 relative to the central portion in the width direction of the substrate 120.

As described above, the end portion 121a of the optical waveguide 121 is arranged such that the gap G is eliminated (or reduced relative to the gap G illustrated in FIGS. 3(A) and 3(B)). Meanwhile, the size of the gap G may depend on not only the mode of arrangement of the end portion 121a of the optical waveguide 121 but also the mode of bonding of the optical path conversion element 150 and the substrate 120 or the ferrule 140. Therefore, it may be possible to apply a bonding mode that can eliminate the gap G to the optical path conversion element 150.

Specifically, as illustrated in FIG. 2, the optical path conversion element 150 includes a corner portion 150a formed by a surface fixed on the ferrule 140 and a surface fixed on the end surface 120a of the substrate 120 on the end portion 121a side of the optical waveguide 121. The optical path conversion element 150 is bonded to the ferrule 140 in a state in which the corner portion 150a is arranged at a position outside the ferrule 140. Furthermore, the optical path conversion element 150 is bonded to the end surface 120a of the substrate 120 on the end portion 121a side of the optical waveguide 121 in a state in which the corner portion 150a is arranged at a position close to the through path 131 of the housing 130 relative to a side surface 120b of the substrate 120 corresponding to the through path 131 of the housing 130. By bonding the optical path conversion element 150 and the substrate 120 or the ferrule 140 as described above, it is possible to eliminate the gap G.

Incidentally, as described above, the optical path conversion element 150 is inserted together with the ferrule 140 from the through path 131 of the housing 130, and bonded to the end surface 120a of the substrate 120 on the end portion 121a side of the optical waveguide 121 by using an adhesive agent. Therefore, it may be possible to apply, to the substrate 120, a configuration for increasing efficiency of an operation of bonding the optical path conversion element 150 and the end surface 120a of the substrate 120 on the end portion 121a side of the optical waveguide 121.

Specifically, the end surface 120a of the substrate 120 on the end portion 121a side of the optical waveguide 121 is inclined to a direction approaching the through path 131 of the housing 130. This makes it possible to easily bond the optical path conversion element 150 that is inserted together with the ferrule 140 from the through path 131 of the housing 130 and the end surface 120a of the substrate 120 on the end portion 121a side of the optical waveguide 121. As a result, it is possible to increase the efficiency of the bonding operation.

As described above, according to the embodiment, the optical path conversion element with a size smaller than the width of the substrate and smaller than the width of the ferrule along the longitudinal direction of the substrate is inserted from the through path of the housing, and bonded to the end surface of the substrate on the end portion side of the optical waveguide such that the end portion of the optical waveguide is arranged at a position close to the through path of the housing. Therefore, a gap between the substrate and the ferrule is eliminated (or reduced), an adhesive agent having a heat-shrinkable property is prevented from flowing into the gap, and a relative positional relationship of the optical path conversion element and the optical waveguide is not shifted. As a result, it is possible to prevent fluctuation in the optical loss caused by a temperature change.

According to an embodiment of the optical module disclosed in the present application, it is possible to prevent fluctuation in the optical loss caused by a temperature change.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical module comprising:
    a substrate on which an optical waveguide is provided;
    a housing that houses the substrate and includes a through path for sealing, the through path being arranged on a side wall of the housing so as to extend in a direction that crosses the optical waveguide;
    a ferrule that houses an end portion of an optical fiber; and
    an optical path conversion element that is fixed on the ferrule, that is inserted from the through path of the housing and fixed on an end surface of the substrate on an end portion side of the optical waveguide by using an adhesive agent, that converts an optical path of light emitted from the end portion of the optical fiber housed in the ferrule such that the optical path goes toward the end portion of the optical waveguide, and that has a size smaller than a width of the substrate and a width of the ferrule along a longitudinal direction of the substrate, wherein
    the end portion of the optical waveguide is arranged at a position close to the through path of the housing relative to a central portion in a width direction of the substrate, and
    the optical path conversion element has a corner portion formed by a surface fixed on the ferrule and a surface fixed on the end surface of the substrate on the end portion side of the optical waveguide and protruding into a gap between the end surface of the substrate on the end portion side of the optical waveguide and a side surface of the ferrule, and is, with the adhesive agent toward the gap blocked by the corner, fixed on the end surface of the substrate on the end portion side of the optical waveguide.

2. The optical module according to claim 1, wherein the end surface of the substrate on the end portion side of the optical waveguide is inclined to a direction approaching the through path of the housing.

* * * * *